United States Patent [19]

Grossmann et al.

[11] 3,940,365

[45] Feb. 24, 1976

[54] MOULDING COMPOSITION BASED ON POLY(OXYMETHYLENE)

[75] Inventors: Hans-Hermann Grossmann, Oberems, Taunus; Karlheinz Burg; Günter Sextro, both of Naurod, Taunus, all of Germany

[73] Assignee: Hoechst Aktiengesellschaft, Frankfurt am Main, Germany

[22] Filed: Sept. 26, 1974

[21] Appl. No.: 509,742

[30] Foreign Application Priority Data

Sept. 28, 1973 Germany............................ 2348808

[52] U.S. Cl.. 260/45.9 P; 260/45.8 N; 260/45.95 R
[51] Int. Cl.[2]........................ C08K 5/20; C08K 5/21
[58] Field of Search .... 260/45.9 P, 45.95 R, 45.8 N

[56] References Cited
UNITED STATES PATENTS

| | | | |
|---|---|---|---|
| 3,131,165 | 4/1964 | Hermann et al. | 260/45.9 P |
| 3,314,918 | 4/1967 | Berardinelli et al. | 260/45.9 P |
| 3,316,206 | 4/1967 | Hermann et al. | 260/45.9 P |
| 3,394,103 | 7/1968 | Szilagyi | 260/45.9 P |
| 3,563,955 | 2/1971 | Hafner et al. | 260/45.9 P |
| 3,679,744 | 7/1972 | Knell et al. | 260/45.9 P |
| 3,683,020 | 8/1972 | Luethi et al. | 260/45.9 P |
| 3,686,304 | 8/1972 | Merger | 260/45.9 P |

FOREIGN PATENTS OR APPLICATIONS

| | | | |
|---|---|---|---|
| 1,225,671 | 3/1971 | United Kingdom | 260/45.9 P |
| 1,225,672 | 3/1971 | United Kingdom | 260/45.9 P |

OTHER PUBLICATIONS

Chemical Abstracts, Volume 52, No. 17, Sept. 10, 1958, p. 15127.

*Primary Examiner*—Ronald W. Griffin
*Attorney, Agent, or Firm*—Curtis, Morris & Safford

[57] ABSTRACT

Polyacetals can be stabilized by means of a stabilizing composition, one of its components acting concurrently as a nucleating agent. Linear oxymethylene-polymers are used as polyacetals. The stabilizing composition consists of an urea-like compound and a phenolic anti-oxidation agent. Moulding compositions based on these stabilized polyacetals are appropriate for being worked-up in the thermoplastic state to shaped articles of all kinds.

5 Claims, No Drawings

MOULDING COMPOSITION BASED ON POLY(OXYMETHYLENE)

It is a known fact that oxymethylene-polymers (poly-oxymethylenes POM) have a strong tendency to crystallize. Upon freezing the melt slightly a rapid growth of spherulites is observed which are mostly larger than the wave length of light and confer a considerable opacity upon the material. Moreover, owing to the crystallization process a great number of microscopically small fissures and internal tensions are formed in the interior and on the surface of the material. These fissurs and internal tensions detrimentally affect the mechanical properties of shaped articles, such as injection moulded articles, made of poly(oxymethylenes). The aforesaid flaws are the more pronounced, the larger the individual spherulites.

It is also known that by adding talc to poly(oxymethylenes) of high molecular weight and by uniformly distributing the inorganic additive in the organic material, the crystal structure of injection moulded articles can be rendered more uniform and thus a structure of coarse spherulites (average diameters of 100 microns) can be transferred into homogeneous structures with spherulite diameters of from 4 to 8 microns (cf. German "Auslegeschrift no. 1,247,645). Since there is the question of injection moulded test specimen, the aforesaid sizes refer to substances which have been submitted to crystallization under pressure and at temperatures of from 50° to 100°C.

It is further known that the spherulite size of poly(oxymethylenes) can be reduced, when the poly(oxymethylenes) are mixed prior to melting with certain organic low-molecular nucleating agents slightly soluble or insoluble in the poly(oxymethylene)melt, e.g. derivatives of imidazoles or pyrazines containing hydroxyl groups (cf. German Offenlegungsschrift No. 1,694,078).

However, the known nucleating agents have no stabilizing effect on poly(oxymethylenes) against thermal-acidolytical degradation.

On the other hand, a great number of organic compounds are known which have a stabilizing effect on poly(oxymethylenes), but no nucleating effect. The most important feature of the stabilizing effect of these compouonds is their prevention of thermal-acidolytical degradation.

As stabilizers for poly(oxymethylenes) are known, for example, amides (cf. German Auslegeschrift No. 1,104,695), urea-compounds (cf. German Auslegeschrift No. 1,185,371), amidines (cf. German Auslegeschrift No. 1,285,736), triazines (cf. German Offenlegungsschrift No. 1,494,997), hydrazines, aromatic amines and urea (cf. German Auslegeschrift No. 1,127,080), cyclic ureides (cf. German Auslegeschrift No. 1,188,803), semicarbazones (cf. German Auslegeschriften Nos. 1,152,542 and 1,241,110) as well as oxalic acid diamides (cf. German Offenlegungsschrfit No. 1,693,010). The aforesaid nitrogen-containing stabilizers are usually applied combined with phenolic anti-oxidizing agents.

The subject of the present invention is a moulding composition based on poly(oxymethylene) consisting essentially of a mixture of a. 99.90 to 95 weight % of a linear poly(oxymethylene), b. 0.05 to 2.5 weight % of at least one compound having a nucleating effect and containing from one to four of the groups —NH—CO— and including in all from two to eight nitrogen atoms, and c. 0.05 to 2.5 weight % of at least one phenolic oxidation stabilizer.

The moulding composition is preferably composed of a. from 99.8 to 98.0 weight % of a linear poly(oxymethylene), b. of from 0.1 to 1.0 weight % of at least one organic compound having nucleating action and c. of from 0.1 to 1.0 weight % of at least one phenolic oxydation stabilizer. Preference is given to the use of ureas, oxalic acid diamides and azodicarboxylic amides as organic compounds having nucleating action.

By ureas are especially understood compounds having formulae (I), (II) and (III),

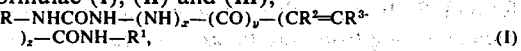

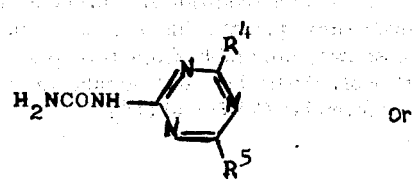

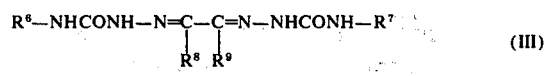

$x$, $y$ and $z$ being each zero or 1 and the sum of $x$, $y$ and $z$ being 1 or 2, R and $R^1$ being each a hydrogen atom, an alkyl radical having from one to six, preferably one, two or three carbon atoms or a phenyl radical, $R^2$ and $R^3$ being each a hydrogen atom or an alkyl radical having one, two or three carbon atoms, $R^4$ and $R^5$ each being an alkyl radical having from one to six, preferably one, two or three carbon atoms or an amino group or ureido-group — both of which may be substituted with one or two alkyl radicals, each having from one to six, preferably one, two or three carbon atoms — and $R^6$, $R^7$, $R^8$ and $R^9$ being each a hydrogen atom or an alkyl radical having from one to six, preferably one, two or three carbon atoms.

By oxalic acid diamides are especially to be understood compounds having formulae (IV), (V) and (VI),

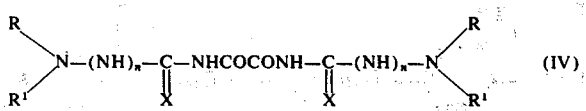

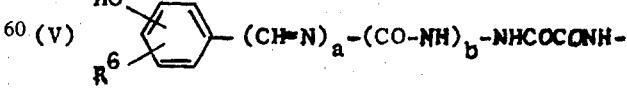

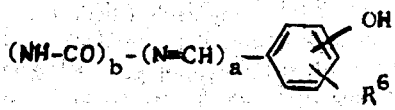

or

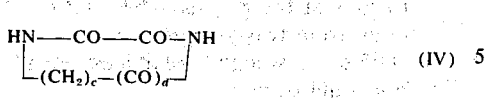  (IV)

$n$ being zero or 1, the sum of $a$ and $b$ being 1, $c$ being 1, 2 or 3 and $d$ being zero, or $c$ being zero and $d$ being 1, X being an oxygen atom or an imino group, R and $R^1$ being each a hydrogen atom, an alkyl radical having from one to six, preferably one, two or three carbon atoms or a phenyl radical, and $R^6$ being a hydrogen atom or an alkyl radical having from one to six, preferably one, two or three carbon atoms.

Azodicarboxylic amides are compounds having formula (VII)

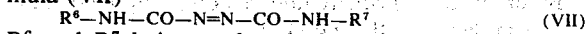  (VII)

$R^6$ and $R^7$ being each a hydrogen atom or an alkyl radical having from one to six, preferably one, two or three carbon atoms.

By phenolic oxidizing stabilizers are especially to be understood polyphenols, i.e., compounds including at least two, preferably from two to six hydroxyphenyl radicals. Particularly well suitable are compounds having formulae (VIII) and (IX), (VIII) 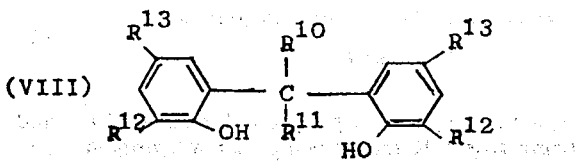

(IX)

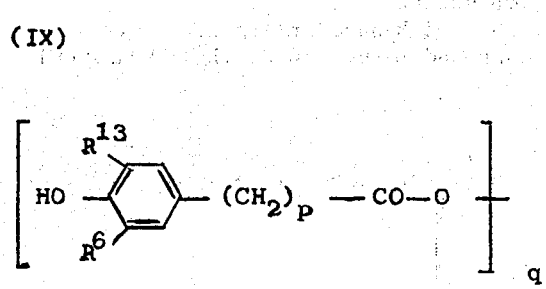

$R^{10}$ and $R^{11}$ being each a hydrogen atom or a methyl radical, $R^{12}$ being a branched alkyl radical having three, four or five carbon atoms and $R^{13}$ being an alkyl radical having from one to six, preferably one, two or three carbon atoms, $R^6$ being a hydrogen atom or alkyl radical having from one to six, preferably one, two or three carbon atoms, A being an aliphatic hydrocarbon radical being from bivalent to hectavalent, $p$ being zero or an integer from 1 to 6, preferably 1, 2 or 3 and $q$ corresponding to the valency of A.

As compounds of formula (I) can be cited — for example — ureido-urea (hydrazodicarboxylic diamide), methylureido-urea, methylureido-methyl-urea, phenylureido-urea, ureido-methyl-urea, ureido-ethyl-urea, ureido-phenyl-urea, phenyl-ureido-phenyl-urea, ureido-oxamide, N-methyl-N'-ureido-oxamide, oxaluramide, oxalurmethylamide, oxaluranilide, methyloxaluramide, methyloxaluro-methyl-amide, maleuramide and maleuranilide.

As compounds of formula (II) are used, for example, 2,4-dimethyl-6-ureido-triazine, 2-methyl-4-amino-6-ureido-triazine, 2-methyl-4,6-bis-ureido-triazine, 2,4,6-trisureidotriazine, 2,4-diamino-6-ureido-triazine and 2,4-bis(dimethylamino)-6-ureido-triazine.

Compounds of formula (III) are particularly semicarbazones of 1,2-dioxo-compounds, e.g. glyoxaldisemicarbazone, diacetyldisemicarbazone, glyoxalbis(methylsemicarbazone) and diacetyl-bis(methylsemicarbazone).

As examples for compounds of formula (IV) are to be specified: bisguanidino-oxamide, bisaminoguanidino-oxamide, bisguanyl-oxamide, biscarbamoiloxamide, bis(aminoureido)oxamide, bis(dimethylaminoureido)oxamide and bis(phenylaminoureido)-oxamide.

By compounds of formula (V) are to be understood derivatives of oxalyldihydrazide, i.e., bishydrazones or bishydrazides oxalyl-dihydrazide with phenolaldehydes or phenolcarboxylic acids, for example bis-hydrazone from salicylic aldehyde and oxalyl-dihydrazide, bis-hydrazone from p-hydroxybenzaldehyde and oxalyl-dihydrazide, bis-hydrazide from salicyclic acid and oxalyl-dihydrazide and bis-hydrazide from p-hydroxybenzoic acid and oxalyl-dihydrazide.

As compounds of formula (VI) are used 1,4-diaza-2,3-dioxo-cyclopentane, -cyclohexane and -cycloheptane as well as parabanic acid.

Suitable compounds of formula (VII) are, for example, azodicarboxylic amide, N-methyl-azodicarboxylic amide, N,N-dimethyl-azodicarboxylic amide, N,N'-dimethyl-azodicarboxylic amide, N,N,N',N'-tetramethyl-azodicarboxylic aamide and the corresponding ethyl, propyl, butyl, pentyl and hexyl compounds.

As examples for compounds of formula (VIII) can be cited: bis(2-hydroxy-3-tert.butyl-5-methyl-phenyl)-methane, 1,1-bis(2-hydroxy-3-tert.butyl-5-methyl-phenyl)-ethane, 2,2-bis(2-hydroxy-3-tert.butyl-5-methyl-phenyl)-propane, bis(2-hydroxy-3,5-di-tert.butyl-phenyl)-methane, 1,1-bis(2-hydroxy-3,5-di-tert.butyl-phenyl)-ethane, 2,2-bis(2-hydroxy-3,5-di-tert.butyl-phenyl)-propane, bis(2-hydroxy-3,5-diisopropyl-phenyl)-methane, 1,1-bis (2-hydroxy-3,5-di-isopropyl-phenyl)-ethane and 2,2-bis(2-hydroxy-3,5-diisopropyl-phenyl)-propane.

As compounds of formula (IX) are well appropriate e.g. esters of ω-(3-tert.butyl-4-hydroxy-phenyl)pentanoic acid, β-(3-methyl-5-tert.butyl-4-hydroxyphenyl)-propionic acid, 3,5-ditert.butyl-4-hydroxybenzoic acid, (3,5-ditert.butyl-4-hydroxy-phenyl)-acetic acid, β-(3,5-di-tert.butyl-4-hydroxy-phenyl)-propionic acid or (3,5-diisopropyl-4-hydroxy-phenyl)-acetic acid with ethylene glycol, propanediol-(1,2), propanediol-(1,3), butanediol-(1,4), hexanediol-(1,6), decanediol-(1,10), 1,1,1-tri-methylolethane or pentaerythritol.

Use is made of linear homopolymers of formaldehyde or trioxane or of linear trioxane-copolymers as poly(oxymethylenes). By homopolymers of formaldehyde or trioxane are to be understood formaldehyde-homopolymers or trioxane-homopolymers the hydroxyl terminal groups of which have been chemically stabilized against degradation, for example by esterification or etherification. By trioxane-copolymers are to be understood copolymers of trioxane and cyclic ethers, cyclic acetals and/or linear polyacetals having primary alcohol terminal groups.

As comonomers for trioxane are to be considered (a) cyclic ethers having from three to five, preferably three ring members, (b) cyclic acetals other than trioxane having from six to 11, preferably five, six, seven or eight ring members and (c) linear polyacetals — in quantities of from 0,1 to 20, preferably from 0,5 to 10 weight % each. Most suitable are copolymers consisting of from 99 to 95 weight percent of trioxane and from 1 to 5 weight percent of one of the aforesaid co-components.

Particularly suitable comonomers for trioxane are compounds having the formula (X)

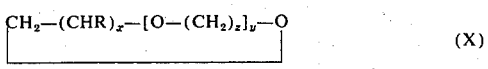

$$CH_2-(CHR)_x-[O-(CH_2)_z]_y-O \quad (X)$$

in which R represents a hydrogen atom, an alkyl radical having from one to six, preferably one, two or three carbon atoms and which can be substituted by one, two or three halogen atoms, preferably by chlorine atoms, an alkoxymethyl radical having from two to six, preferably two, three or four carbon atoms, a phenyl radical or a phenoxymethyl radical, $x$ represents an integer from 1 to 3, $y$ being zero; $y$ being an integer from 1 to 3, $x$ being zero and $z$ being 2; and $z$ being an integer from 3 to 6, preferably 3 or 4, $x$ being zero and $y$ being 1.

Suitable cyclic ethers are especially epoxides, e.g. ethylene oxide, styrene oxide, propylene oxide and epichlorhydrin as well as phenylglycidyl ether.

Suitable cyclic acetals are especially cyclic formals of aliphatic or cycloaliphatic α,ω-diols having from two to eight, preferably two, three or four carbon atoms, the carbon chain of which may be interrupted at intervals of two carbon atoms by an oxygen atom, e.g. glycol formal (1,3-dioxolane), propanediol formal (1,3-dioxane), butanediol formal (1,3-dioxepane) and diglycol formal (1,3,6-trioxocane) as well as 4-chloromethyl-1,3-dioxolane, hexanediol formal (1,3-dioxonane) and butenediol formal (1,3-dioxa-cycloheptene-(5)).

Suitable linear polyacetals are as well homopolymers or copolymers of the afore-specified cyclic acetals as also linear condensation products of aliphatic or cycloaliphatic α,ω-diols with aliphatic aldehydes or thioaldehydes, preferably formaldehyde. Special preference is given to the use of homopolymers of cyclic formals of aliphatic α,ω-diols having from two to eight, preferably two, three, or four carbon atoms, e.g. poly(1,3-dioxolane), poly(1,3-dioxane) and poly(1,3-dioxepane).

The values for the reduced specific viscosity (RSV-values) of the linear poly(oxymethylenes) used according to the invention (measured on a solution of the polymer in butyrolactone, containing 2 weight percent of diphenylamine, at 140°C at a concentration rate of 0.5 g/100 ml) are from 0.07 to 2.50 dl·g⁻¹, preferably from 0.14 to 1.20 dl·g⁻¹. The crystallite melting points of the poly(oxymethylenes) keep within the range of from 140° to 180°C, preferably from 150° to 170°C, the density ranging from 1.38 to 1.45 g·ml⁻², preferably from 1.40 to 1.43 g·ml⁻¹ (measured according to DIN = German Industrial Norms No. 53,479).

The linear trioxane-copolymers — preferably binary or ternary — used according to the invention are prepared in knwon manner by polymerizing the monomers in the presence of cationically active catalysts at temperatures from 0° to 100°C, preferably from 50° to 90°C (cf. e.g. German Auslegeschrift No. 1,420,283). Catalysts used for this purpose are e.g. Lewis acids, for example boron trifluoride and antimony penta fluoride, and complex compounds of Lewis acids, preferably etherates, for example boron trifluoride-diethyletherate and boron trifluoride-di-tert.-butyletherate. Further suitable compounds are protonic acids, for example perchloric acid, as well as saline compounds, for example triphenyl-methylhexafluorophosphate, trithyloxoniumtetrafluoroborate or acetylperchlorate. Polymerization may be carried out in bulk, in suspension or in solution. So as to eliminate instable portions, the copolymers are usefully submitted to a thermal or hydrolytic, controlled partial degradation down to primary alcohol terminal groups (cf. e.g. German Auslegeschriften Nos. 1,445,273 and 1,445,294).

The homopolymers of formaldehyde or of trioxane — used according to the invention — are also prepared in known manner by catalytical polymerization of the monomer (cf. e.g. German Auslegeschrift No. 1,037,705 and German Pat. No. 1,137,215).

Most usefully, the moulding composition as per the invention is prepared by mixing the components being present either as powder or granule and by subsequent homogenizing. The nucleating agents used according to the invention are preferably applied as powders fine as dust having a particle size below 5, preferably below 3 microns. Mixing is usually carried out at room temperature, preferably at a temperature of from 15° to 30°C, and homogenizing takes place in any kind of heatable mixing device, such as drums, calenders, kneaders or extruders, at a temperature above the crystallite melting point of the poly(oxymethylene), i.e., at a temperature of from 150° to 250°C, preferably from 170° to 220°C.

Evidently, the presence of the compounds used as per the invention with the group —NH—CO— upon preparation of shaped articles bring about nucleating which shows in decreasing spherulite sizes and which improves the mechanical properties of the shaped articles.

For example, the ball indentation hardness, the stretching strain, the tensile strength and torsional stiffness — as compared to those of a non-modified linear poly(oxymethylene)— are improved. Another consequence of nucleating is an increased cyrstallization speed thus providing for an increased work-up speed, this latter quality shows especially in shorter cycle periods upon injection moulding and in reduced tolerance ranges for injection-moulded articles.

The use of the compounds identified as component (b) offers the special advantage that these compounds have not only a nucleating action, but also a good stabilizing effect against a thermal-acidolytical degradation of poly(oxymethylenes). Contrary to the nucleating or stabilizing agents hitherto used which acted either for stabilization without nucleating or yielded nucleating action without any stabilizing effect, the agents of the present invention offer concurrently efficient nucleating and stabilizing action against thermal-acidolytical degradation.

The moulding composition according to the invention can be crushed mechanically, for example by chopping or grinding, to yield granules, chips, flakes or powder. It is very well suited to be worked-up in the thermoplastic state, e.g. by injection moulding or extrusion, especially for preparing shaped articles to be used e.g. as bars, sticks, plates, films, ribbons, jars and tubes; it is a most suitable technical material for the preparation of machinery parts having stable dimensions and an exact size, such as gear wheels, bearing parts and control elements.

The following examples ilustrate the invention:

EXAMPLES 1 TO 15

A linear copolymer made of 98 weight percent of trioxane and 2 weight percent of ethylene oxide having a density of 1.41 $g \cdot ml^{-1}$, an RSV-value of 0.73 $dl \cdot g^{-1}$ and a crystallite melting point of 166°C is mixed — as a powder — with 0.5 weight percent of bis(2-hydroxy-3-tert.butyl-5-methyl-phenyl)-methane and the quantities of nucleating agent specified in tables 1 to 3, calculated on the quantity of the linear poly(oxymethylene), and homogenized at 200°C in a single screw extruder. The residence time in the cylinder of the extruder is about 4 minutes. The poly(oxymethylene) mass obtained in each case is granulated after emerging from the extruder.

A film is prepared from the moulding composition obtained and the size of the spherulites determined; preparation of the film is carried out as follows: the moulding composition is made molten at 180°C between two glass plates under a pressure of 200 $kg \cdot cm^{-2}$ and subsequently crystallized at 150°C under atmospherical pressure to yield a film 10 microns thick for microscopical examination. Moreover, from the moulding composition obtained plates are prepared by injection-moulding having the dimensions 60 × 60 × 2 mm at a mass temperature of 200°C and a mould temperature of 80°C, these plates being used for determining the ball indentation hardness according to VDE regulations 0302 (loading time 10 seconds). Furthermore, the weight loss of the granulated moulding composition is determined by exposing the granule for 2 hours under air to a temperature of 230°C. Spherulite size, ball indentation hardness and weight loss of shaped articles of the moulding composition according to the invention are shown in table 2. For comparison, the corresponding data of poly(oxymethylenes) blended with known heat stabilizers or only with the antioxidizing agent are also compiled (see examples A to I in table 1)

EXAMPLES 16 TO 20

Poly(oxymethylenes) of various compositions as powder are blended with 0.5 weight percent each of bis(2-hydroxy-3-tert.butyl-5-methylphenyl)-methane as oxidizing stabilizer and with the nucleating agents specified in table 3 and at the quantities indicated there, calculated on the quantity of the poly(oxymethylene) and — as per the description given for examples 1 to 15 — homogenized and granulated.

Table 3 indicates spherulite size and weight loss; for comparison, the corresponding data of poly(oxymethylenes) have been compiled which contain the oxidation stabilizer only (cf. examples K to O).

TABLE 1

(Comparative examples)

| Example | stabilizer (weight%) | | spherulite-size (micron) | ball indentation hardness (kg/cm²) | weight less (%/2 h) |
|---|---|---|---|---|---|
| A | — | | 500 | 1555 | >50 |
| B | Oxalic acid diamine | 0.3 | 450 | 1550 | 4.5 |
| C | Isophthalic acid diamide | 0.3 | 400 | 1550 | 7.8 |
| D | Sebacic acid diamide | 0.3 | 500 | 1545 | 6.3 |
| E | Malonic acid diamide | 0.3 | 350 | 1550 | 3.9 |
| F | Succinic acid diaminde | 0.3 | 450 | 1550 | 4.3 |
| G | N-butyl-N'-methoxy-phenyl-oxalic acid diamide | 0.3 | 450 | 1545 | 5.1 |
| H | 4-hydroxybenzaldehyde-semicarbazone | 0.3 | 450 | 1550 | 5.8 |
| I | 4-dimethylamino-benzaldehyde-semicarbazone | 0.3 | 350 | 1555 | 4.7 |

TABLE 2

| Ex. | Nucleating agent (weight %) | | spherulite size (micron) | ball indentation hardness (kg/cm²) | weight loss (%/2h) |
|---|---|---|---|---|---|
| 1 | Ureido urea | 0.3 | 30 | 1600 | 4.3 |
| 2 | Ureidooxamide | 0.3 | 50 | 1580 | 4.1 |
| 3 | Oxaluramide | 0.3 | 40 | 1595 | 3.3 |
| 4 | Maleinuramide | 0.3 | 25 | 1600 | 5.9 |
| 5a | 2-methyl-4-amino-6-ureido-triazine | 0.3 | 45 | 1580 | 7.2 |
| 5b | " | 0.6 | 20 | 1610 | 4.3 |
| 5c | " | 1.5 | 15 | 1600 | 4.1 |

TABLE 2-continued

| Ex. | Nucleating agent (weight %) | | spherulite size (micron) | ball indentation hardness (kg/cm²) | weight loss (%/2h) |
|---|---|---|---|---|---|
| 6a | 2-methyl-4,6-bis-ureido-triazine | | 0.3 | 50 | 1585 | 9.5 |
| 6b | '' | | 1.0 | 30 | 1600 | 6.0 |
| 6c | '' | | 1.5 | 25 | 1590 | 5.3 |
| 7a | 2,4,6-trisureido-triazine | | 0.3 | 20 | 1605 | 4.9 |
| 8a | Glyoxal-disemicarbazone | | 0.3 | 15 | 1625 | 2.5 |
| 8b | '' | | 0.6 | 10 | 1615 | 2.4 |
| 9a | Diacetyl-disemicarbazone | | 0.3 | 25 | 1600 | 5.9 |
| 9b | '' | | | 15 | 1610 | 4.1 |
| 10 | Bisguanidino-oxamid | | 0.3 | 10 | 1620 | 3.3 |
| 11 | Bis(aminoguanidino)-oxamide | | 0.3 | 8 | 1635 | 4.8 |
| 12 | Oxalyldihydrazide-salicylaldehyde-bishydrazone | | 0.3 | 20 | 1605 | 4.1 |
| 13 | Oxalyldihydrazide-salicylic acid bishydrazide | | 0.3 | 20 | 1590 | 3.7 |
| 14 | 1,4-Diaza-2,3-dioxo-cyclopentane | | 0.3 | 18 | 1610 | 6.3 |
| 15 | Parabanic acid | | 0.3 | 7 | 1630 | 7.2 |

TABLE 3

| Ex. | Poly(oxymethylene) | nucleating agent (weight %) | spherulite size (micron) | weight loss (%/2h) |
|---|---|---|---|---|
| K | Polyformaldehyd, acetyliert (RSV: 0.84 dl/g) | — | 140 | >50 |
| L | Copo.+) 98 TO 2 DO (RSV: 1.17 dl/g) | — | 280 | >50 |
| M | Copo. 95 TO 5 DO (RSV: 0.98 dl/g) | — | 350 | >50 |
| N | Copo. 95 TO 5 EO (RSV: 0.52 dl/g) | — | 350 | >50 |
| O | Copo. 96.6 TO 3.4 DO (RSV: 1.25 dl/g) | — | 330 | >50 |
| 16 | Polyformaldehyde, acetylated (RSV: 0.84 dl/g) | Glyoxal-disemicarbazone 0.3 | 15 | 23 |
| 17 | Copo. 98 TO 2 DO (RSV: 1.17 dl/g) | '' 0.3 | 20 | 2.3 |
| 18 | Copo. 95 TO 5 DO (RSV: 0.98 dl/g) | '' 0.3 | 35 | 1.9 |
| 19 | Copo. 95 TO 5 EO (RSV: 0.52 dl/g) | '' 0.3 | 15 | 2.1 |
| 20 | Copo. 96.6 TO 3.4 DO (RSV: 1.25 dl/g) | Azodicarboxylic amide 0.3 | 15 | 4.3 |

+)Copolymer made of 98 weight % of trioxane and 2 weight % of dioxolane
TO = Trioxane
DO = Dioxolane
EO = Ethyleneoxide

What is claimed is:

1. A moulding composition based on poly(oxymethylene) and consisting essentially of a mixture of
   A. 99.9 to 95 weight percent of a linear poly(oxymethylene),
   B. 0.05 to 2.5 weight percent of at least one phenolic oxidation stabilizer, and
   C. 0.05 to 2.5 weight percent of at least one compound having a nucleating effect and selected from
      a. a urea having the formula R—NHCONH—(NH)$_x$—(CO)$_y$—(CR$^2$=CR$^3$—)$_z$—CONH—R$^1$,    (I)

or

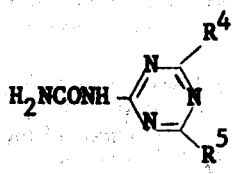

(II)

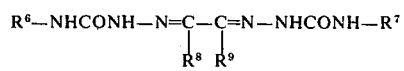 (III)

wherein x, y and z are each zero or 1 and the sum of x, y and z is 1 or 2,

R and $R^1$ are each a hydrogen atom, an alkyl radical having from one to six carbon atoms or a phenyl radical, $R^2$ and $R^3$ are each a hydrogen atom or an alkyl radical having one, two or three carbon atoms, $R^4$ and $R^5$ are each an alkyl radical having from one to six carbon atoms or an amino or ureido group, both of which may be substituted with one or two alkyl radicals each having from one to six carbon atoms, and $R^6$, $R^7$, $R^8$ and $R^9$ are each a hydrogen atom or an alkyl radical having from one to six carbon atoms, b. an oxalic acid diamide of the formula

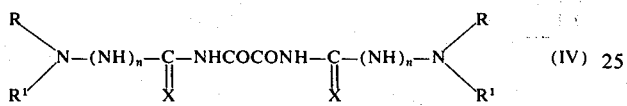 (IV)

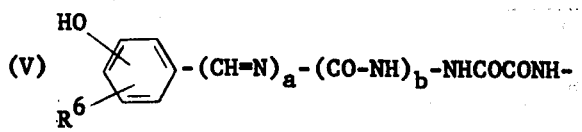 (V)

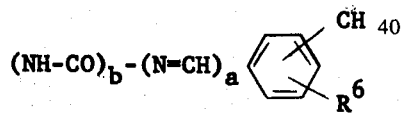

or

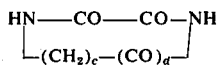 (VI)

wherein n is zero or 1,
the sum of a and b is 1,
c is 1, 2 or 3, and
d is zero, or c is zero and d is 1,
X is an oxygen atom of an imino group, R and $R^1$ are each a hydrogen atom, an alkyl radical having from one to six carbon atoms or a phenyl radical, and
$R^6$ is a hydrogen atom or an alkyl radical having from one to six carbon atoms, and c. an azodicarboxylic amide of the formula
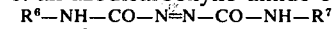
wherein $R^6$ and $R^7$ are each a hydrogen atom or an alkyl radical having from one to six carbon atoms.

2. A moulding composition according to claim 1 wherein the phenolic oxidation stabilizer is a compound having the formula (VIII)

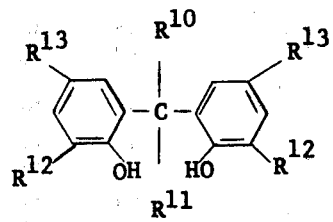 or (IX)

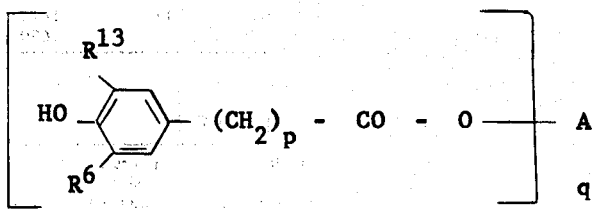

wherein $R^{10}$ and $R^{11}$ each are a hydrogen atom or a methyl radical, $R^{12}$ is a branched alkyl radical having three, four or five carbon atoms, $R^{13}$ is an alkyl radical having from one to six carbon atoms, $R^6$ is a hydrogen atom or an alkyl radical having from one to six carbon atoms, A is an aliphatic hydrocarbon radical that is bivalent to hectavalent, p is zero or an integer from 1 to 6 and q corresponds to the valency of A.

3. A moulding composition based on poly(oxymethylene) consisting essentially of a mixture of A. 99.9 to 95 weight percent of a linear poly(oxymethylene), B. 0.05 to 2.5 weight percent of at least one phenolic oxidation stabilizer, and C. 0.05 to 2.5 weight percent of at least one compound having a nucleating effect and which is a urea of the formula

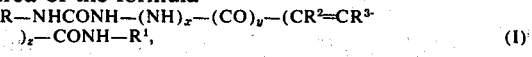 (I)

(II) 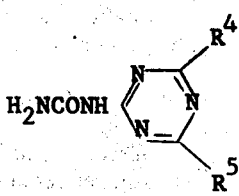

or

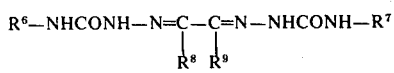 (III)

wherein $x$, $y$ and $z$ are each zero or 1 and the sum of $x$, $y$ and $z$ is 1 or 2, R and $R^1$ are each a hydrogen atom, an alkyl radical having from one to six carbon atoms or a phenyl radical, $R^2$ and $R^3$ are each a hydrogen atom or an alkyl radical having one, two or three carbon atoms, $R^4$ and $R^5$ are each an alkyl radical having from one to six carbon atoms or an amino or ureido group, both of which may be substituted with one or two alkyl radicals each having from one to six carbon atoms, and $R^6$, $R^7$, $R^8$ and $R^9$ are each a hydrogen atom or an alkyl radical having from one to six carbon atoms.

4. A moulding composition based on poly(oxymethylene) consisting essentially of a mixture of
   A. 99.9 to 95.0 weight percent of a linear poly(oxymethylene),
   B. 0.05 to 2.5 weight percent of at least one phenolic oxidation stabilizer, and
   C. 0.05 to 2.5 weight percent of at least one compound having a nucleating effect and which is an oxalic acid diamine of the formula

 (IV)

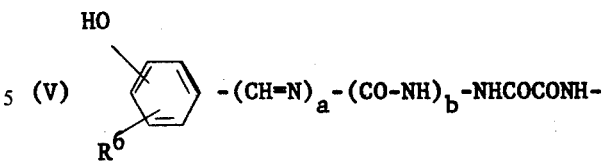 (V)

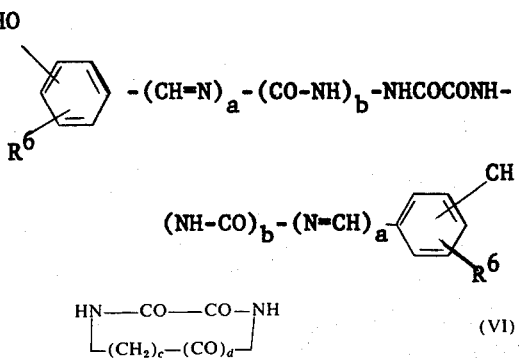 (VI)

wherein $n$ is zero or 1,
the sum of $a$ and $b$ is 1,
$c$ is 1, 2 or 3, and
$d$ is zero, or $c$ is zero and $d$ is 1,
X is an oxygen atom of an imino group, R and $R^1$ are each a hydrogen atom, an alkyl radical having from one to six carbon atoms or a phenyl radical, and
$R^6$ is a hydrogen atom or an alkyl radical having from one to six carbon atoms.

5. A mouldng composition based on poly(oxymethylene) and consisting essentially of a mixture of
   A. 99.9 to 95.0 weight percent of a linear poly(oxymethylene),
   B. 0.05 to 2.5 weight percent of at least one phenolic oxidation stabilizer, and
   C. 0.05 to 2.5 weight percent of at least one compound having a nucleating effect and which is an azodicarboxylic amide of the formula
   $R^6$—NH—CO—N=N—CO—NH—$R^7$.  (VII)
wherein $R^6$ and $R^7$ are each a hydrogen atom or an alkyl radical having from one to six carbon atoms.

* * * * *